(12) United States Patent
Mierisch et al.

(10) Patent No.: US 7,140,995 B2
(45) Date of Patent: Nov. 28, 2006

(54) GEAR DRIVE

(75) Inventors: Uwe Mierisch, Baunatal (DE); Jürgen Roth, Bloomfield, MI (US)

(73) Assignee: DaimlerChrysler AG, Stuttgart (DE)

( * ) Notice: Subject to any disclaimer, the term of this patent is extended or adjusted under 35 U.S.C. 154(b) by 213 days.

(21) Appl. No.: 10/915,835

(22) Filed: Aug. 11, 2004

(65) Prior Publication Data

US 2006/0035741 A1 Feb. 16, 2006

(51) Int. Cl.
*F16H 48/06* (2006.01)
*F16H 57/04* (2006.01)
(52) U.S. Cl. ..................... 475/221; 184/6.12
(58) Field of Classification Search ............. 475/221, 475/159, 160; 74/606 R, 467, 468; 184/6.12
See application file for complete search history.

(56) References Cited

U.S. PATENT DOCUMENTS

| 1,032,724 | A | * | 7/1912 | Adams | 184/6.12 |
|---|---|---|---|---|---|
| 2,708,985 | A | * | 5/1955 | Evans et al. | 184/11.1 |
| 3,529,698 | A | * | 9/1970 | Nelson | 184/6.12 |
| 4,470,324 | A | * | 9/1984 | Renk et al. | 74/606 R |
| 4,615,231 | A | * | 10/1986 | Takahashi | 74/467 |
| 4,721,184 | A | * | 1/1988 | Sowards | 184/6.12 |
| 5,242,033 | A | * | 9/1993 | Toraason | 184/6.12 |
| 5,839,926 | A | * | 11/1998 | Kaye | 440/37 |
| 6,616,432 | B1 | * | 9/2003 | Szczepanski et al. | 418/126 |
| 2004/0108169 | A1 | * | 6/2004 | Eschenburg | 184/6.12 |

FOREIGN PATENT DOCUMENTS

| DE | 3743671 A1 | * | 7/1988 |
|---|---|---|---|
| DE | 4132780 A1 | * | 4/1992 |
| JP | 49-7405 | | 1/1969 |
| JP | 03-48153 | | 9/1989 |
| JP | 408178031 A | * | 7/1996 |
| JP | 92 16524 | | 8/1997 |
| JP | 2001 271916 | | 10/2001 |

* cited by examiner

*Primary Examiner*—Roger Pang
(74) *Attorney, Agent, or Firm*—Klaus J. Bach

(57) ABSTRACT

In a gear drive for a motor vehicle comprising a first gear, a second gear in engagement with the first gear, an oil sump arranged below the second gear such that the second gear is partially immersed in the oil sump, and an oil collection structure disposed at a level higher than the oil sump for collecting oil carried by the gears out of the oil sump, the second gear is provided at least at one side thereof with an oil guide element which extends at the side of the first gear over the engagement area thereof with the second gear and carries oil upward for collection in the oil collection structure.

7 Claims, 2 Drawing Sheets

GEAR DRIVE

BACKGROUND OF THE INVENTION

The invention resides in a gear drive for a motor vehicle including a first gear engaged with a second gear which is immerged into an oil-collecting sump disposed below the second gear of the gear drive.

DE 3 743 671 A1 discloses a gear drive which includes an oil collection arrangement for collecting splash oil. The splash oil is generated by the rotation of gears which are partially immersed into the oil sump. The oil collection arrangement supplies the oil to transmission components which are not directly supplied with lubricant since they are arranged above the oil sump. For filling the oil collection arrangement the gears must reach a minimum speed since below that speed the centrifugal forces are so small that the oil flows down from the gears immersed into the oil sump and does not reach the oil collection arrangement. Particularly when the oil collection arrangement has run empty because of an extended standstill of the gear drive a reliable lubrication of the components disposed outside the oil sump is not ensured.

It is the object of the present invention to provide a gear drive which provides for a safe lubrication of all components of the gear drive even at low gear speeds.

SUMMARY OF THE INVENTION

In a gear drive for a motor vehicle comprising a first gear, a second gear in engagement with the first gear, an oil sump arranged below the second gear such that the second gear is partially immersed in the oil sump, and an oil collection structure disposed at a level higher than the oil sump for collecting oil carried by the gears out of the oil sump, the second gear is provided at least at one side thereof with an oil guide ring element which extends at the side of the first gear over the engagement area thereof with the second gear and carries oil upward for collection in the oil collection structure.

The gear tooth engagement area is the area in which the two gears are in contact with each other. The oil guide element is an added part and consists of sheet metal or of plastic. The oil guide element may be an annular or disc-like element. For adaptation to the oil properties and/or operating conditions the oil guide element may have a particular surface such as a PTFE coating and/or it may have a particular configuration at its outer circumference. In order to prevent the oil guide element from interfering with the second gear the oil guide element is arranged in spaced relationship from the front wall of the second gear which is in engagement with the first gear. The outer diameter of the oil guide element is so selected that, in the tooth engagement area, at least the gear tips of the first gear or the foot end of the second gear is covered by the oil guide element. In this way, it is made sure that the oil pressed outwardly at the tooth engagement area is splashed onto the oil guide element which, by the effect of the centrifugal forces carries the oil along radially and in the direction of rotation of the gear. The first gear and also the oil guide element move the oil toward the oil collection structure. The oil squeezed outwardly upon engagement of the teeth of the first and second gears does not all flow back into the sump but part thereof is splashed onto the oil collection structure.

In a particular embodiment of the invention, the first and second gears are provided with helical gearing. The helical gearing has the advantage that oil is moved in an axial direction based on the direction of rotation of the gears. The movement direction depends on the gearing direction. This direction is so selected that the gears direct the oil toward the oil guide element. The oil drops disposed in the tooth gaps are moved by the impulses imparted by the inclined teeth toward the oil guide element while at the same time also the oil squeezed out of the engagement area between the teeth is directed toward the oil guide structure. In an advantageous way, the oil, which is carried by the second gear in the gaps between the teeth out of the oil sump, is directed toward the oil guide element.

Preferably, the two side faces of the first gear are both provided with an oil guide structure. Particularly straight toothed spur wheels press the oil out of the tooth engagement area in axial direction at both sides of the gears. In order to collect as much oil in the oil collection structure as possible, the first gear is provided at both sides thereof with an oil guide structure.

In another embodiment of the invention, the oil collection structure includes an opening arranged radially with respect to the first gear and the oil guide element. The oil collection structure is intended to collect as much oil as possible. The oil collection structure is disposed above the oil sump radially off the first gear. The oil released from the first gear and the oil guide element is released tangentially from the first gear and the oil collection element and is directed toward the opening. Also, splash oil flowing down along the housing wall reaches the oil collection structure by way of the opening.

Preferably, the oil guide element is form-fittingly connected to the first gear. Advantageously, the oil guide element is engaged with the first gear, that is, the radially inner edge of the oil guide element is received, by spring action of the radially inner end of the oil guide element in an annular groove of the first gear or it is connected to the first gear by a deformation procedure such as rolling.

The oil collection structure may provide lubricating oil for bearings and gearings arranged above the oil sump. The oil collection structure is arranged at a higher level than the components to be lubricated so that the oil can flow to these components by gravity, and components disposed above the oil sump such as antifriction and friction bearings are supplied with oil in a reliable manner.

Further features and advantages of the invention will become apparent from the following description of a particular embodiment thereof shown, by way of example only, in the accompanying drawings.

DESCRIPTION OF A PREFERRED EMBODIMENT

Figure 1:
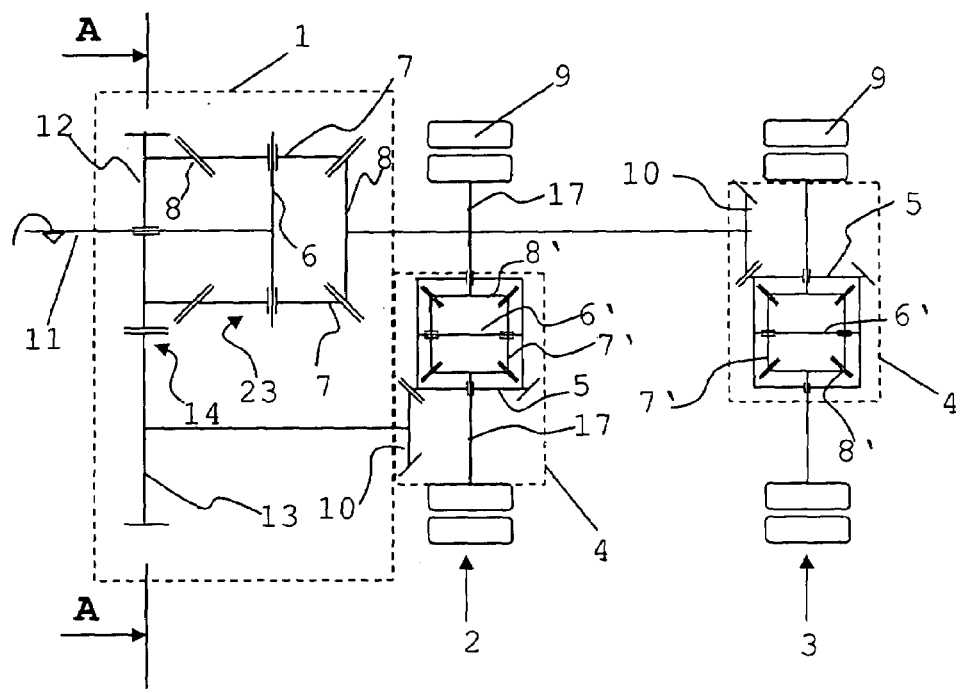
FIG. 1 shows, schematically, a gear drive arrangement for a motor vehicle with two driven axles.
Figure 2:
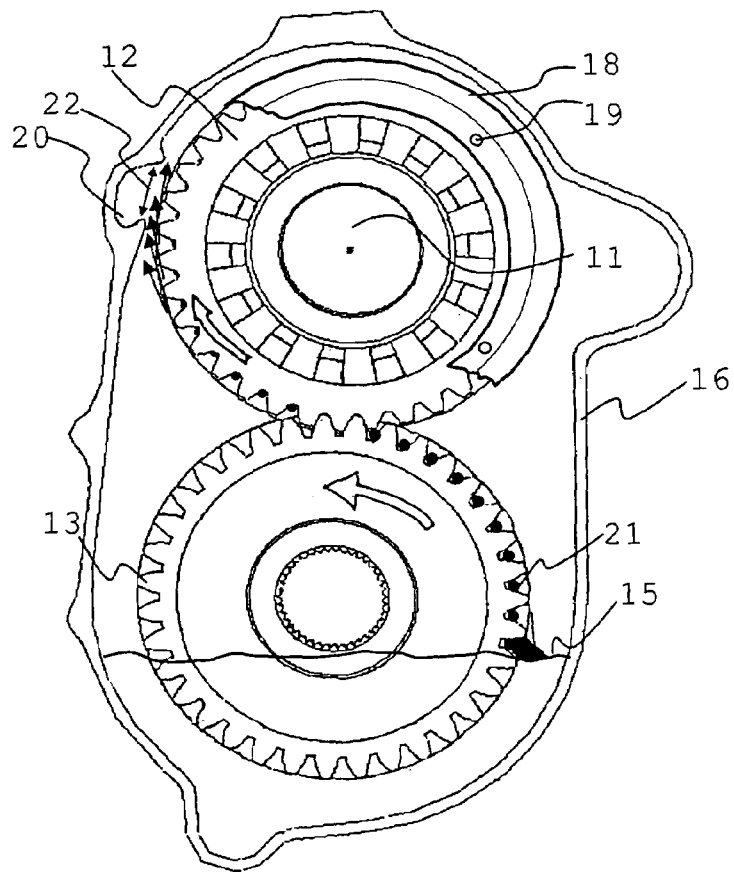
FIG. 2 is a cross-sectional view of one of the gear drives of FIG. 1.
Figure 3:
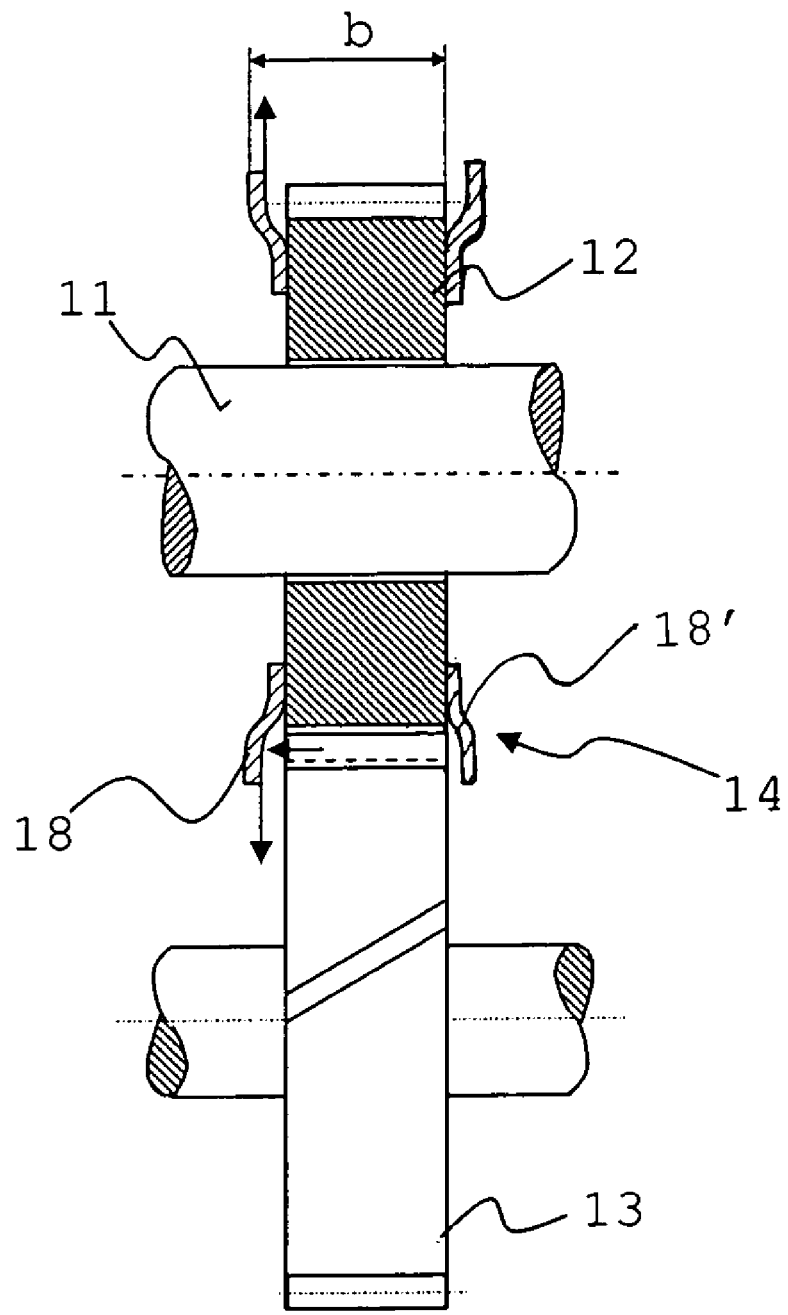
FIG. 3 is an axial cross-sectional view of the gear drive shown in FIG. 2.

Identical components are designated in FIGS. 1–3 by the same reference numerals.

FIG. 1 shows a drive arrangement in a drive train for two driven axles 2, 3 of a motor vehicle. The drive train includes a distribution drive 1 and differential transmissions 4 for the first and the second axles 2, 3. The differential transmissions 4 include each a bevel gear 5 driven by a bevel gear 10, four differential gears 7' mounted on differential gear shafts 6' and two axle shaft bevel gears 8' connected to the vehicle wheels 9. The differential transmissions 4 transmit the engine torque to the wheels 9 while accommodating the different wheel speeds in curves.

The distribution drive 1 includes a spur gear stage 14 and an intermediate differential transmission 23. The intermediate differential transmission 23 includes a differential transmission star shaft 6, differential gears 7 and differential output wheels 8. An input shaft 11 is connected to the differential star shaft 6. Differential gears 7 supported on the differential gear star shaft 7 transfer the torque to the differential output gears 8. One of the differential output gears 8 is connected to the drive bevel gear 10 of the differential transmission 4 of the second axle 3 and the other differential output gear 8 is connected, by way of first and second spur gears 12 and 13 of a spur gear set 14, to the first axle 2. The first spur gear 12 is rotatably supported on the input shaft 11 and is in engagement with the second spur gear 13 which is coupled to the drive bevel gear 10 of the axle differential transmission 4 of the first axle 2. The distribution drive 1 transmits the engine power provided by the engine to the input shaft 11 to the driven axles 2, 3 and accommodates the different speeds of the drive shafts of the two driven axles so as to prevent relative tensions in the drive train.

FIG. 2 is a cross-sectional view of a spur gear set 14 of a distribution drive as shown in FIG. 1. Preferably, the spur gear set 14 and the intermediate differential transmission 23 are arranged in a common housing 16. The distribution drive then comprises one input shaft 11 and two output shafts which are connected to the differential transmissions 4. However one of the differential transmissions 4 may additionally be accommodated in the housing 16, so that the distribution drive 1 has one input shaft, two side shafts 17 connected to the wheels of the first axle 2 and an output shaft connected to the differential transmission of the second axle 3. The housing 16 is filled with transmission oil to a level such that the second gear 13 is partially immersed in the oil.

The first gear 12 is provided at one face thereof with an oil guide ring element 18. Another oil guide ring element 18' may be provided at the opposite face of the first gear 12. The oil guide ring element 18 consists of sheet metal of plastic material and is connected to the first gear for example by spot welds 19. Alternatively, the oil guide ring element 18 may be connected to the first gear 12 by screws or by rivets or the metal sheet guide ring element 18 may be snapped or rolled into a groove provided on the first gear 12.

The oil guide element 18 is in the form of a closed ring. FIG. 2 shows only a segment of the ring. To improve the effect of carrying along the oil, the surface of the ring may be structured or coated. The outer edge of the ring does not need to be circular; it may have a different form adapted to provide certain effects for the oil guide element 18.

The gears 12, 13 are provided with a helical gearing so that the oil is moved axially out of the gear engagement area similar to the action in gear pumps. Because of the inclination of the gears the oil is moved toward one end face of the gears, for example to the front face of the gears 12, 13 at which side the oil guide element 18 is arranged (see FIG. 3).

In the housing 16 as shown in FIG. 2, an oil collection structure 20 in the form of a channel 20 is provided adjacent the second gear 12 and the oil guide element 18. The oil thrown tangentially off the gears 12 and the oil guide element 18 is collected in the channel 20. Some of the oil splashes directly into the channel 20, some runs down the inner wall of the housing 16 into the channel 20. The input shaft 11 is also arranged in the housing 16 and is supported by bearings which are not shown.

The channel 20 conducts the oil collected therein to the bearings of the input shaft 11 and to the components 6, 7, 8 of the intermediate shaft differential transmission 23. The channel 20 is so arranged that the oil flows to the components to be lubricated by gravity. As far as possible all components, which cannot be directly supplied by oil from the oil sump, should be supplied with oil by way of the channel 20. The gear drive according to the invention includes the oil guide element 18 which provides for a filling of the channel 20 even at low rotational speeds of the spur gear set 14 that is under conditions as they may occur at low speeds in a creep speed stage.

As shown in FIG. 2, the gaps between the teeth of the second gear 13 carry oil volumes 21 toward the first gear 12.

In the engagement area with the first gear 12, the oil in the oil volumes 21 is squeezed out from between the teeth preferably in the direction toward the oil guide element 18 because of the helical gearing of the gears 12 and 13, see FIG. 3. The oil hits the oil guide element 18 and is partially reflected back into the gaps between the teeth of the gear 12 and partially adheres to the oil guide element 18.

The oil reflected back into the gaps between the teeth of the first gear 12 and the oil adhering to the oil guide element 18 is moved toward the channel 20. Oil thrown off the gear 12 tangentially by the centrifugal forces is directed partially into the channel 20. Other oil running down the inner wall of the housing 16 is also collected in the channel 20.

The admission opening 22 of the channel 20 is arranged radially off the gear 12 and extends at least over the width b of the gear 12 and the oil guide element 18, see FIG. 3. The admission opening 22 of the channel 20 is arranged as close as possible to the first gear 12, or respectively, the oil guide element 18.

Then also the oil drops which, because of a low speed of the first gear 12 and the guide element 18, have little kinetic energy will overcome the distance between the first gear 12 or, respectively, the oil guide element 18 and reach the opening to the oil channel 20.

In an embodiment which is not shown in the drawings the spur gear set 14 includes straight teeth. Since then the oil is squeezed out of both sides in the engagement area of the teeth, oil guide elements 18 are arranged at both sides of the first gear 12. As a result, the oil is collected at both sides of the first gear 12 and is at least partially supplied to the oil channel 20 for use in the lubrication of the various components.

The gear drive according to the invention provides also at low speeds for a reliable lubrication of components which are not arranged in the oil sump such as bearings or gear sections. The use of such oil guide elements 18 is of course not limited to distribution drives 1. The arrangement of the oil guide element 18 in connection with a gear that is arranged outside the oil sump can be used in connection with any type of gear drive for example in gear shift transmissions and in industrial drives etc.

What is claimed is:

1. A gear drive for a motor vehicle comprising a first gear (12), a second gear (13) in engagement with the first gear (12), and an oil sump disposed below the second gear (13) such that the second gear (13) is partially immersed in the oil sump, an oil collection structure (20) disposed at a higher level than the oil sump for collecting oil carried by the second and the first gears upward out of the oil sump, said first gear (12) having at least at one side thereof an oil guide ring element (18) which is firmly connected to the first gear (12), and extends over the engagement area of the first gear (12) with the second gear (13) in axially spaced relationship for collecting oil squeezed axially out of the area of engagement of the first and second gears and throw it tangentially off the oil guide ring element (18) into the oil collecting structure (20).

2. A gear drive according to claim 1, wherein the first and the second gears (12, 13) are provided with helical gearing by way of which they are in engagement with each other whereby the oil is axially squeezed out of the area of engagement of the first and second gears (12, 13) toward one end face of the gears and the oil guide ring element (18) is arranged at the one side of the first gear (12).

3. A gear drive according to claim 1, wherein oil guide ring elements (18, 18') are arranged at both sides of the first gear (12).

4. A gear drive according to claim 1, wherein the oil collection structure (20) includes an oil collection channel having a collection opening 22 arranged radially adjacent the first gear (12) and the oil guide ring element (18).

5. A gear drive according to claim 1, wherein the oil collection structure (20) provides lubricating oil to bearings and gear structures disposed above the oil sump.

6. A gear drive according to claim 1, wherein the gear drive is part of a power distribution drive (1).

7. A gear drive according to claim 6, wherein the first and second gears (12, 13) are part of a distribution drive (1) which is disposed in a housing (16), and the first and second gears (12, 13), an intermediate differential transmission (23) and an axle differential transmission (4) are all arranged in the same housing (16).

* * * * *